(12) United States Patent
Watkins

(10) Patent No.: US 9,776,599 B2
(45) Date of Patent: Oct. 3, 2017

(54) VEHICLE TRACKING CONTROL SYSTEMS AND METHODS

(71) Applicant: Daniel G. Watkins, Watkins, CO (US)

(72) Inventor: Daniel G. Watkins, Watkins, CO (US)

( * ) Notice: Subject to any disclaimer, the term of this patent is extended or adjusted under 35 U.S.C. 154(b) by 46 days.

(21) Appl. No.: 14/451,002

(22) Filed: Aug. 4, 2014

(65) Prior Publication Data

US 2016/0032535 A1    Feb. 4, 2016

(51) Int. Cl.
*E01C 9/00*    (2006.01)
*B60S 3/04*    (2006.01)
*E01C 9/08*    (2006.01)

(52) U.S. Cl.
CPC .............. *B60S 3/042* (2013.01); *E01C 9/086* (2013.01)

(58) Field of Classification Search
CPC ......... E01C 9/08; E01C 2201/00; B60S 3/042
USPC ...................................... 404/15, 35
See application file for complete search history.

(56) References Cited

U.S. PATENT DOCUMENTS

| | | | |
|---|---|---|---|
| 2,402,090 A * | 6/1946 | Ruppel | E01C 9/10 404/36 |
| 2,496,119 A * | 1/1950 | Cesen | B60B 39/12 238/14 |
| 3,334,554 A | 8/1967 | Adams | |
| 3,858,803 A | 1/1975 | Gantert | |
| 4,650,115 A | 3/1987 | Fontaine | |
| 4,681,482 A | 7/1987 | Arciszewski et al. | |
| 4,917,125 A * | 4/1990 | Midkiff | B60S 3/042 134/123 |
| 5,100,054 A | 3/1992 | Fickett et al. | |
| 5,261,433 A | 11/1993 | Smith | |
| 5,383,742 A | 1/1995 | Grace | |
| 5,439,171 A | 8/1995 | Fruend | |
| 5,769,563 A | 6/1998 | Flynn | |
| 5,775,834 A | 7/1998 | Jackson | |
| 5,862,983 A | 1/1999 | Andrus et al. | |
| 6,443,667 B2 | 9/2002 | Brown | |
| 6,874,972 B2 | 4/2005 | Davis et al. | |
| 6,881,006 B1 * | 4/2005 | Lange | E01C 9/08 238/14 |
| 6,981,818 B1 | 1/2006 | Lange | |
| 7,059,799 B1 | 6/2006 | Lange | |
| 7,163,351 B1 * | 1/2007 | Shaver | B60S 3/042 15/53.1 |
| 7,300,224 B2 | 11/2007 | Slater | |
| 7,731,448 B2 | 6/2010 | Fillie | |
| 7,775,739 B1 | 8/2010 | Lange | |
| 7,937,793 B1 * | 5/2011 | Gilbert | B60S 3/042 15/36 |
| 8,061,927 B1 | 11/2011 | Martinez | |

(Continued)

OTHER PUBLICATIONS

"Erosion Control and Stormwater Quality Field Guide", 2011, pp. 1-95, Publisher: Colorado Department of Transportation.

(Continued)

*Primary Examiner* — Raymond W Addie
(74) *Attorney, Agent, or Firm* — Fogg & Powers LLC

(57) ABSTRACT

A vehicle sediment tracking control device includes: a plurality of tread deformation stages, wherein the tread deformation stages are separated from each other by a plurality of thru slats; wherein each of the plurality of tread deformations stages comprise a base section and a pitched surface that defines a continuous cleat, the pitched surface having a peak that includes a serrated edge.

18 Claims, 4 Drawing Sheets

(56) References Cited

U.S. PATENT DOCUMENTS

| | | | |
|---|---|---|---|
| 8,210,443 | B2 | 7/2012 | Studstill |
| 9,016,977 | B2 | 4/2015 | Rosier |
| 9,458,578 | B2 | 10/2016 | Klein |
| 2006/0222804 | A1 | 10/2006 | Banting |
| 2012/0012138 | A1 | 1/2012 | Garrett |
| 2013/0259568 | A1* | 10/2013 | Bouchard .............. B26D 3/005 404/35 |
| 2015/0361624 | A1 | 12/2015 | Rosier |

OTHER PUBLICATIONS

"Grizzly Trackout Control Device", , pp. 1-2, Retrieved Jul. 28, 2014 from http://www.trackoutcontrol.com/trackout_brochure.pdf.

"Vehicle Tracking Pads", "Stormwater Quality Best Management Practices Construction Sites", 2008, pp. 1-5, Publisher: Indiana Department of Transportation.

"Track-Out Control Mat", , pp. 1-5, Publisher: RubberForm Recycled Products, LLC; Retrieved Jul. 24, 2014 from http://www.rubberform.com/products/road-construction/track-out-control-mat.

"Stone Tracking Pad", "Dane County Erosion Control and Stormwater Management Manual", Jan. 2, 2007, pp. 1-2.

"Temporary Vehicle Tracking Pad",Dec. 21, 2009 , http://www.fm.colostate.edu/construction/drawings/L-21.temporary-vehicle-tracking-pad.pdf, p. 1.

YouTube, "Rumble Track", "retrieved from : https://www.youtube.com/watch?v=RN1w3ZUplcQ", Mar. 27, 2008, pp. 1-4.

"Track Out Control Mat", "retrieved Dec. 10, 2015 from http://rubberform.com/products/road-construction/track-out-control-mat/", , pp. 1-4.

Watkins, "Vehicle Tracking Control Systems and Methods", "U.S. Appl. No. 15/003,591, filed Jan. 21, 2016", dated Jan. 21, 2016, pp. 1-37, Published in: US.

U.S., "Office Action", "From U.S. Appl. No. 15/003,591", dated Jun. 22, 2017, pp. 1-32, Published in: US.

\* cited by examiner

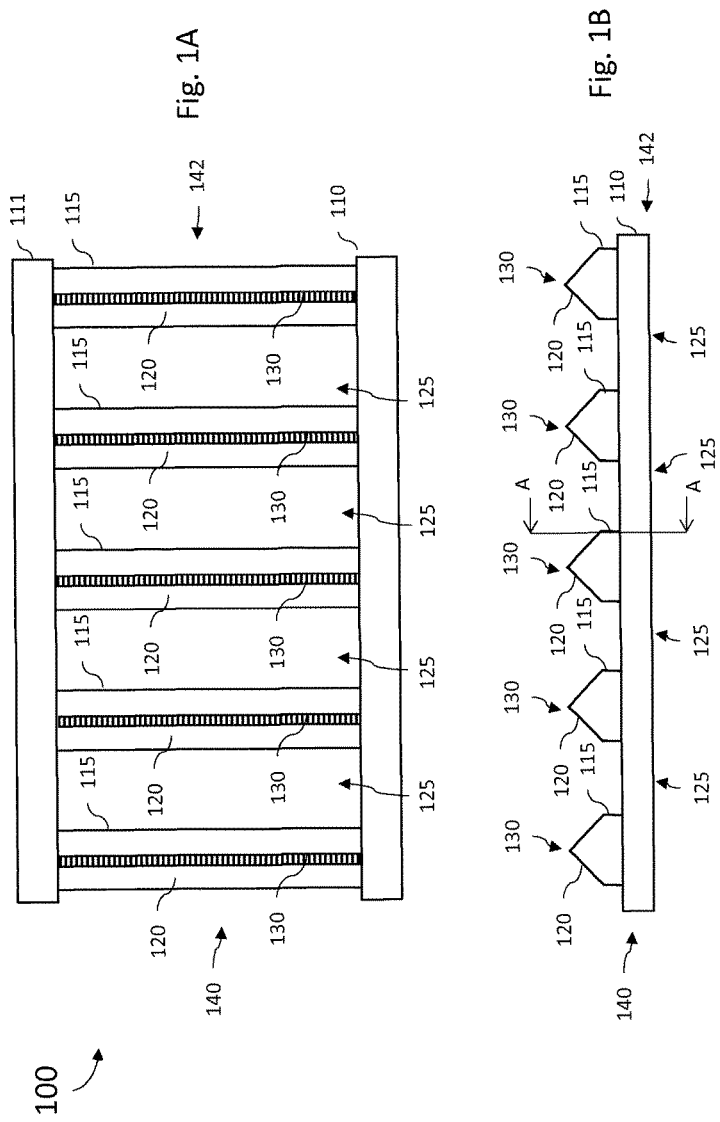

VEHICLE TRACKING CONTROL SYSTEMS AND METHODS

BACKGROUND

Vehicle traffic to and from construction sites has been cited as a significant contributing source of sedimentary pollution in waterways. Construction vehicles collect mud, dirt, sand and other potential pollutants while on the construction site. When these vehicles leave the site, they track these materials with them onto public roads. Then when it rains, the storm runoff carries these materials into lakes, streams and other waterways. Depending of on the size and scope of the construction project, and the requirements of the jurisdiction in which the construction site is located, different permitting may apply to ensure that applicable clean water regulations and statutes are satisfied. The construction industry in the United States has established Best Management Practices (BMPs) which, among other things, provides guidance to construction contractors as to how they can establish controls at their worksites that will satisfy the requirements set forth by permitting agencies.

One of relevant requirements set forth by the BMPs is for construction sites to establish clearly defined vehicle ingress and egress locations and to install Vehicle Tracking Control (VTC) measures at these locations. That is, these VTC measures must control the tracking of sedimentary material by vehicles from the construction site. On nearly all construction sites, the VTC measure typically used at ingress and egress locations is the temporary rock vehicle tracking pad (VTP), which comprises a temporary pad of rock material. The effectiveness of a rock VTP will depend on the size and type of rock used, the length and depth of the pad, as well as how well it is maintained. After repeated use, the rock material can become covered in mud reducing their effectiveness. Therefore, rock VTPs will typically need to be refreshed. Further, heavy vehicles tend to push the rock material into the ground and force mud to the surface. An initial nine inch deep rock pad may become over six feet deep over the course of a project due to rock added to refresh the pad.

Once construction is done, the site of the pad must be stabilized. In some cases, the site may be covered with hardscape such as with concrete or asphalt. But in other cases, the site may need to be landscaped such as with trees, mulch, bark, flowers, sod or natural grasses or other types of vegetation. For the latter, at least some depth of the rock VTP must be removed and top soil brought in to support and enable proper growth of the plant life. Further, to close out the construction permit and receive a passing final inspection of the site, a minimum density uniform coverage of established restored vegetation is required by the permitting agency. Thus, even for just a short duration construction project of only a few days, the task of restoring vegetation after removal of the rock VTP may take a year or longer and require periodic re-inspection of the site. Restoration after removal of the rock VTP may be one of the more significant costs associated with stormwater management of a project.

For the reasons stated above and for other reasons stated below which will become apparent to those skilled in the art upon reading and understanding the specification, there is a need in the art for improved systems and methods for vehicle tracking control.

SUMMARY

The Embodiments of the present invention provide methods and systems for vehicle tracking control and will be understood by reading and studying the following specification.

In one embodiment, a vehicle sediment tracking control device is provided. The device comprises: a plurality of tread deformation stages, wherein the tread deformation stages are separated from each other by a plurality of thru slats; wherein each of the plurality of tread deformations stages comprise a base section and a pitched surface that defines a continuous cleat, the pitched surface having a peak that includes a serrated edge.

DRAWINGS

Embodiments of the present invention can be more easily understood and further advantages and uses thereof more readily apparent, when considered in view of the description of the preferred embodiments and the following figures in which:

FIGS. 1A-1D are diagrams illustrating a Vehicle Tracking Control device of one embodiment of the present invention;

In accordance with common practice, the various described features are not drawn to scale but are drawn to emphasize features relevant to the present invention. Reference characters denote like elements throughout figures and text.

DETAILED DESCRIPTION

Figure 1C:
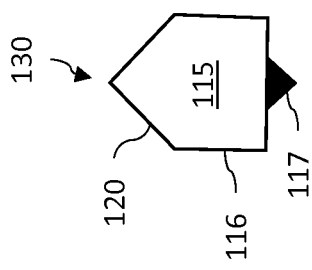

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical and mechanical changes may be made without departing from the scope of the present invention. The following detailed description is, therefore, not to be taken in a limiting sense.

Embodiments of the present invention provide vehicle tracking control (VTC) measures that are less destructive, easier to implement, and are re-usable. More specifically, embodiments for a reusable vehicle tracking pad (VTP) are disclosed. Using various different embodiments, a VTP may be implemented at a construction site using one or more flexible tracking devices as described herein. Where a plurality of flexible tracking devices are used, they are laid out in sections which may be secured to each other or into the ground. Vehicle weight is distributed across the device, in contrast to the vehicle weight being borne entirely in a concentrated area by a handful of rocks. Therefore, there is little settling or burying of the device into the ground, even after repeated use. If settling does occur due to prolonged repeated use, the flexible tracking device may simply be pulled up from the ground and repositioned. As explained in greater detail below, embodiments of the flexible tracking devices described herein may also aid in the post construction stabilization of the pad site because a significant portion of surface vegetation and root structure of pre-existing plants and grasses over which the flexible tracking device is applied is not disturbed. Once construction is completed, the flexible tracking devices are simply lifted up and out. It should be noted that the term "vehicle tires" and "treads" are used throughout this disclosure in a generic sense so that the scope of the disclosure is intended to cover tracking control for vehicles having round tires (such as trucks and cars) as well as vehicles that convey themselves on continuous belt type tracks (such as bulldozers).

FIGS. 1A-1D are diagrams illustrating a flexible tracking device 100 of one embodiment of the present disclosure. Flexible tracking device 100 comprises a plurality of independent tread deformation stages 115, which in this embodiment run laterally between two support rails shown at 110 and 111. Each of the deformations stages 115 are separated from each other by thru slats 125 which are open holes or voids defined by the edges of rails 110 and 111 and deformations stages 115. The deformations stages 115 are distributed along rails 110 and 111 from a first end 140 of the flexible tracking device 100 to a second end 142, where the first and second ends 140 and 142 define an expected path of vehicle travel over the flexible tracking device 100. That is, vehicles are expected to travel a path either from first end 140 to second end 142 or from second end 142 to first end 140.

As illustrated in FIG. 1C, each of the deformations stages 115 comprise a base section 116 and a pitched surface 120, which function together as continuous cleat. The base section 116 is coupled on opposite ends of the deformation stages 115 to the rails 110 and 111. The pitched surface 120 rises up from base 116 to a pinnacle or peak 130. When a vehicle drives over one of the deformations stages 115, the weight of the vehicle causes peak 130 to deform the treads of the vehicle tire thereby loosening sediment embedded in the treads. It should be noted, however, that depending on the diameter of the tires on a vehicle, the tire may interface with multiple deformation stages 115 at the same time, which will affect the amount of deformation any one deformations stage 115 will exert. Peak 130 further provides a scraping action that further removes sediment from the surface of the vehicle tire. In some embodiment, the deformations stages 115 may optionally include one or more anchor cleats 117 on the bottom side of base 116 (i.e., opposite to pitched surface 120) which will dig into the earth and secure the flexible tracking device 100 during vehicle transits.

Figure 1D:
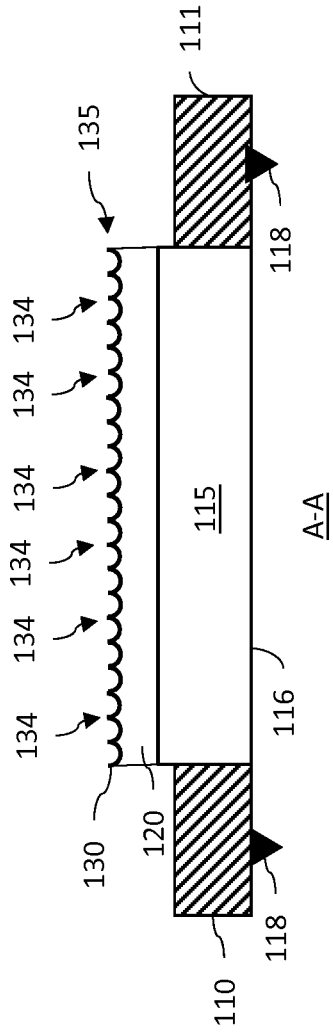

As illustrate in FIG. 1D (which depicts cross section A-A of FIG. 1B), in some embodiments, the peak 130 of the pitched surface 120 may further include a serrated edge (shown at 135) that may include a plurality of initial contact points 134. With these initial contact points 134, the applied pressure across the width of the vehicle tire is initially focused at each point rather than distributed along the width of the tire, breaking hardened sediment into smaller pieces which are more easily removed by the deformation and scraping provided by peak 130. In one embodiment, the contact points 134 may be distributed along the length of the serrated edge on the order of about ½ inches from point to point and the edge itself about ½ inches wide. In some embodiments, the bottom side of rails 110 and 111 may also optionally include one or more anchor cleats 118 that will dig into the earth and secure the flexible tracking device 100 during vehicle transits.

Also as illustrated in FIGS. 1A and 1B, each of the deformations stages 115 are separated from each other by thru slats 125. The slats 115 are open voids that expose regions of the ground over which the flexible tracking device 100 is placed. These slats 125 allow natural vegetation to continue to survive in the region where the flexible tracking device 100 has been deployed. Water and sunlight can continue to reach the underlying vegetation, and air circulation and heat dissipation can continue to take place through the slats 125. As mentioned above, vehicle weight is distributed across the flexible tracking device 100 placing less pressure on any one location. This serves to preserve the root structure of plants covered by the device. The root structures of the vegetation exposed through slats 125 are preserved to an even greater degree because they avoid much of the direct downward pressure from vehicles. This permits natural vegetation to grow back more quickly once the device 100 is removed. The peak 130 of the pitched surface 120 sticks up into the treads of the vehicle to remove sediment while slats 125 allow vegetation to continue to grow and also provides a place for fallen sediment to collect. This configuration is ideal for short duration projects because the region where VTC measures are applied is only minimally disturbed and the flexible tracking device 100 is easily removed. For long duration projects, it may be desired to periodically lift the flexible tracking device 100 to sweep out any sediment deposited through the slats 125. The spacing between deformations stages 115 should be configured to accommodate a range of vehicles different types and tires of different sizes. For example, the deformations stages 115 may be spaced so that the tires of a smaller vehicle (using 13 inch tires for example) do not bottom out through the slats 125 between stages 115.

In one embodiment, it is contemplated that the flexible tracking device 100 will have an approximate width from rail 110 to rail 111 of approximately 30 inches and a total length from the first end 140 to the second end 142 of approximately 96 inches. However, other dimensions may be utilized. For example, in one implementation, a flexible tracking device 100 may have a width from rail 110 to rail 111 of 15 feet. Multiple flexible tracking device 100s may also be positioned adjacent to each other to form a larger vehicle tracking pad. In some implementations, neighboring flexible tracking device 100s may be deployed offset from each other so that deformations stages 115 of one flexible tracking device 100 are aligned to slats 125 of the next.

It is also contemplated that the flexible tracking device 100 is fabricated from a flexible but strong material such but not limited to rubber or similar composite material. Flexibility of the material used to fabricate rails 110, 111 and stages 115 allows device 100 to follow the contour of existing ground on top of which it is deployed. Rubber is also one material that would provide rigidity at peak 130 of the pitched surface 120 to scrape mud. In one embodiment, flexible tracking device 100 is fabricated as a continuous piece of material, such as rubber, which may be cast from a mold configured to form the elements and features of the flexible tracking devices described herein. In other embodiments, individual elements of a flexible tracking device may be separately molded and then fitted together.

Figure 2:
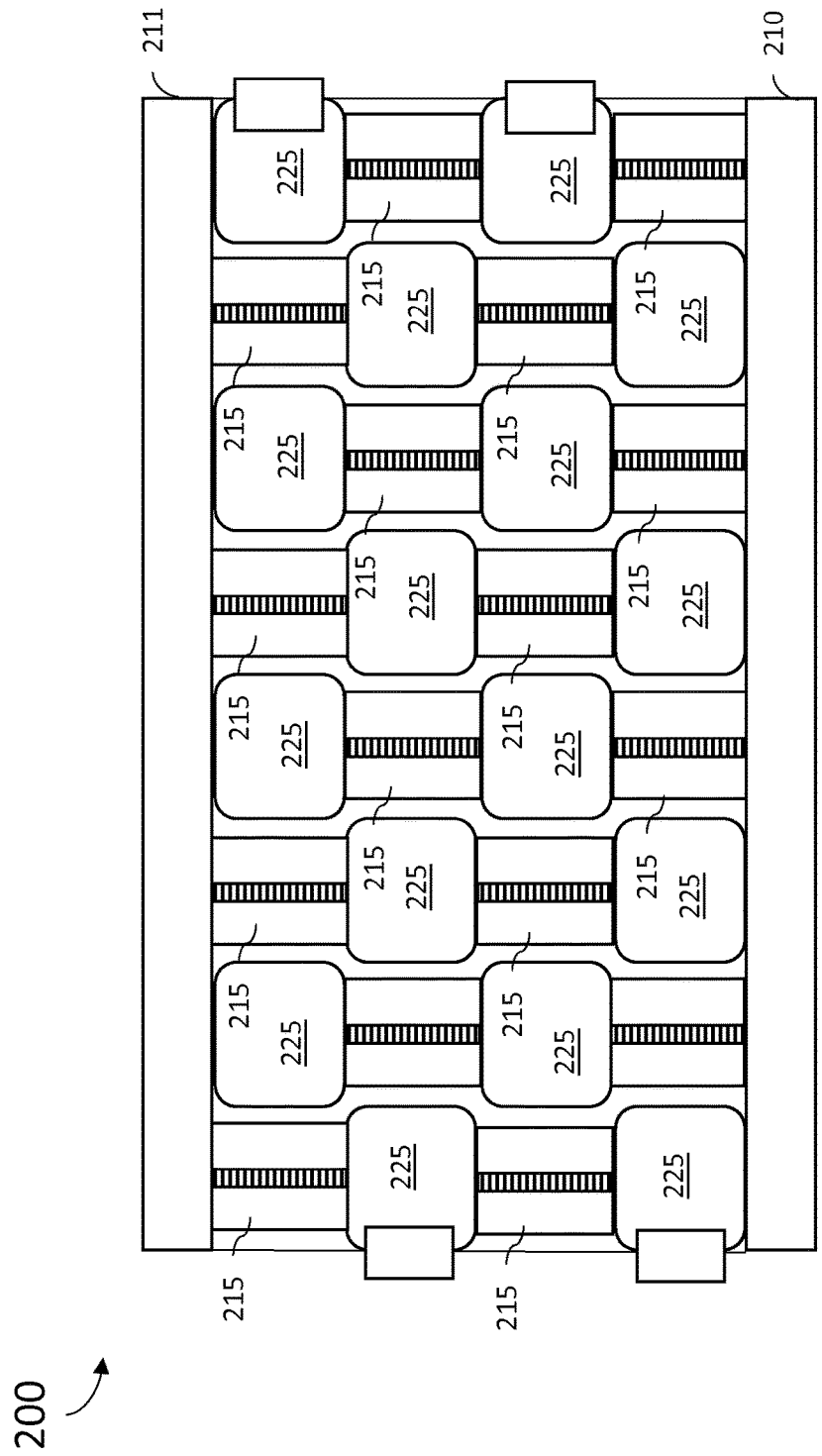
FIG. 2 is a diagram illustrating an alternate Vehicle Tracking Control device of one embodiment of the present invention.

FIG. 2 is a diagram of one alternate embodiment of a flexible tracking device 200 having deformations stages 215 and thru slats 225 alternating in a checker-board pattern between rails 210 and 211. That is, flexible tracking device 200 comprise the same elements and options as described with respect to flexible tracking device 100 except that deformations stages 215 do not extend the entire width of flexible tracking device 200 from rail 210 to rail 211. Instead, flexible tracking device 200 is configured with segments of deformations stages 215 alternating with open slats 225 along both the length and width of device 200.

Figure 3:
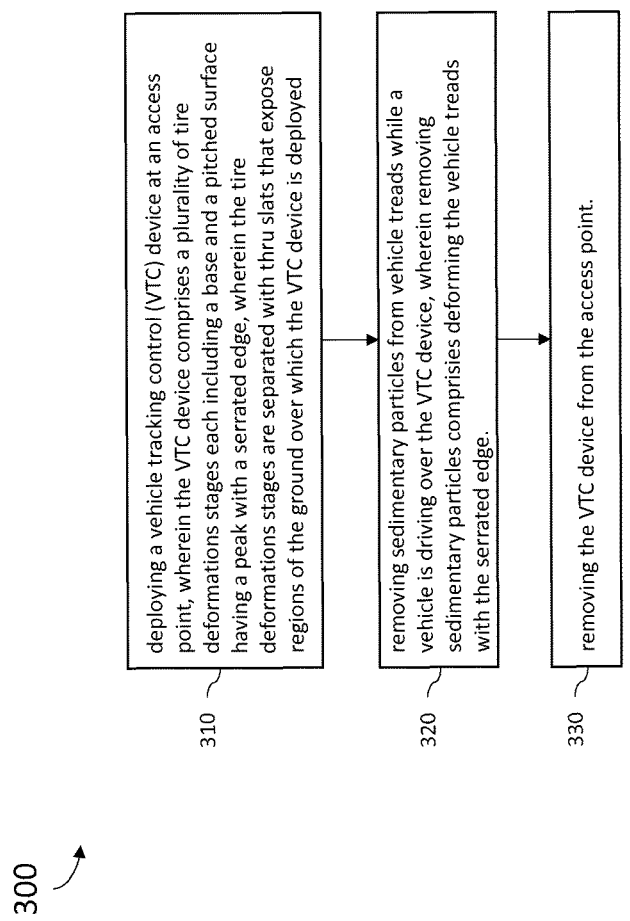
FIG. 3 is a flow chart illustrating a method for Vehicle Tracking Control of one embodiment of the present invention.

FIG. 3 is a flow chart illustrating a method 300 of one embodiment of the present disclosure. The method begins at 310 with deploying a vehicle tracking control (VTC) device at an access point, wherein the VTC device comprises a plurality of tire deformations stages each including a base and a pitched surface having a peak with a serrated edge, wherein the tire deformations stages are separated with thru slats that expose regions of the ground over which the VTC device is deployed. In alternate embodiments, the VTC device may comprise any combination of the flexible tracking devices described herein. The deformations stages may be distributed along rails from a first end of the flexible tracking device to a second end such as illustrated by any of the above figures. The first and second ends define an expected path of vehicle travel over the flexible tracking device such that the peak of the pitched surface runs along an axis approximately perpendicular to the vehicle path. The VTC device is fabricated from a flexible but strong material such but not limited to rubber or similar composite material.

The method proceeds to 320 with removing sedimentary particles from vehicle treads while a vehicle is driving over the VTC device, wherein removing sedimentary particles comprises deforming the vehicle treads with the serrated edge. When a vehicle drives over one of the deformations stages, the weight of the vehicle causes the peak of the deformation stages to deform the treads of the vehicle tire thereby loosening sediment embedded in the treads. The peak further provides a scraping action that further removes sediment from the surface of the vehicle tire. In some embodiments, the serrated edge includes a plurality of initial contact points. The applied pressure across the width of the vehicle tire is initially focused at each of these points rather than distributed along the width of the tire. This serves to break hardened sediment into smaller pieces which are more easily removed by the deformation and scraping provided by the peak. The slats allow natural vegetation to continue to survive in the region where the VTC device has been deployed. Water and sunlight can continue to reach the underlying vegetation, and air circulation and heat dissipation can continue to take place through the slats.

The method proceeds to 330 with removing the VTC device from the access point. Once construction is completed, the VTC device may be simply lifted up and out. Further digging or disturbance of the underlying ground, living vegetation, or vegetation root structures is avoided. For long duration projects, the method may further comprise periodically lifting the VTC device to sweep out any sediment deposited through the slats.

Example Embodiments

Example 1 includes a vehicle sediment tracking control device, the device comprising: a plurality of tread deformation stages, wherein the tread deformation stages are separated from each other by a plurality of thru slats; wherein each of the plurality of tread deformations stages comprise a base section and a pitched surface that defines a continuous cleat, the pitched surface having a peak that includes a serrated edge.

Example 2 includes the device of example 1, further comprising: a first support rail; and a second support rail; wherein the tread deformation stages run laterally between the first support rail and the second support rail.

Example 3 includes the device of example 2, wherein for at least a first tread deformation stage of the plurality of tread deformation stages, the serrated edge extends for a length of the tread deformation stage from the first support rail to the second support rail.

Example 4 includes the device of any of examples 2-3, wherein the base section of each of the plurality of tread deformation stages comprises a first end coupled to the first support rail and a second end coupled to the second support rail.

Example 5 includes the device of any of examples 2-4, wherein the thru slats are open voids defined by edges of the first support rail and the second support rail, and edges of adjacent deformations stages.

Example 6 includes the device of any of examples 2-5, wherein one or both of the first support rail and the second support rail includes one or more anchor cleats on a the bottom side of the base section opposite to the pitched surface, wherein the one or more anchor cleats are configured to dig into the earth and secure the device when a vehicle transits over the device.

Example 7 includes the device of any of examples 2-6, wherein the plurality of tread deformation stages and the first and second support rails are fabricated as a continuous piece of flexible material.

Example 8 includes the device of example 7, wherein the flexible material comprises a rubber material.

Example 9 includes the device of any of examples 2-8, wherein the plurality of tread deformation stages and the thru slats are distributed in an alternating pattern between the first support rail and the second support rail.

Example 10 includes the device of any of examples 1-9, wherein one or more of the plurality of the tread deformations stages includes one or more anchor cleats on a the bottom side of the base section opposite to the pitched surface, wherein the one or more anchor cleats are configured to dig into the earth and secure the device when a vehicle transits over the device.

Example 11 includes the device of any of examples 1-10, wherein the plurality of tread deformation stages are configured with a spacing such that vehicles transiting over the device with a tire size of 13 inches or greater will not bottom out through the thru slats.

Example 12 includes the device of any of examples 1-11, wherein the plurality of tread deformation stages are each fabricated as a continuous piece of flexible material.

Example 13 includes the device of example 12, wherein the flexible material comprises a rubber material.

Example 14 includes a method for mitigating vehicular tracking of sediment, the method comprising: deploying a vehicle tracking control (VTC) device at an access point, wherein the VTC device comprises a plurality of tread deformations stages each including a base and a pitched surface having a peak with a serrated edge, wherein the tire deformations stages are separated with thru slats that expose regions of the ground over which the VTC device is deployed; removing sedimentary particles from vehicle treads while a vehicle is driving over the VTC device, wherein removing sedimentary particles comprises deforming the vehicle treads with the serrated edge; and removing the VTC device from the access point.

Example 15 includes the method of example 14, wherein removing sedimentary particles from vehicle treads while a vehicle is driving over the VTC device further comprises; loosening sediment embedded in the treads using the weight of the vehicle to cause the peak to deform the vehicle treads; and scraping a surface of the vehicle tread using the peak.

Example 16 includes the method of any of examples 14-15, further comprising: a first support rail; and a second support rail; wherein the plurality tread deformation stages run laterally between the first support rail and the second support rail.

Example 17 includes the method of any of examples 14-16, wherein at least one of the first support rail, the second support rail, or the tread deformation stages include one or more anchor cleats, the method further comprising: digging into the Earth with the one or more anchor cleats to secure the VTC device when the vehicle is driving over the VTC device.

Example 18 includes the method of any of examples 14-17, wherein the plurality of tread deformation stages and the first and second support rails are fabricated as a continuous piece of flexible material.

Example 19 includes the method of any of examples 14-18, further comprising: periodically lifting the VTC device to remove sediment deposited through the thru slats.

Example 20 includes the method of any of examples 14-19, wherein removing the VTC device from the access point further comprises lifting the VTC device up and out from the access point.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A vehicle sediment tracking control device, the device comprising:
   a plurality of tread deformation stages, wherein the tread deformation stages are separated from each other by a plurality of thru slats;
   a first support rail; and
   a second support rail;
   wherein the tread deformation stages run laterally between the first support rail and the second support rail;
   wherein each of the plurality of tread deformations stages comprise a base section and a pitched surface that defines a continuous cleat, the pitched surface having a peak that includes a serrated edge; and
   wherein the plurality of tread deformation stages and the first and second support rails are fabricated as a continuous piece of flexible material.

2. The device of claim 1, the pitched surface comprising:
   a first pitched side rising from a first side of the base section;
   a second pitched side rising from a second side of the base section opposite to the first side of the base section;
   wherein the first pitched side and the second pitched side converge at the peak.

3. The device of claim 2, wherein for at least a first tread deformation stage of the plurality of tread deformation stages, the serrated edge extends for a length of the tread deformation stage from the first support rail to the second support rail.

4. The device of claim 2, wherein the base section of each of the plurality of tread deformation stages comprises a first end coupled to the first support rail and a second end coupled to the second support rail.

5. The device of claim 2, wherein the thru slats are open voids defined by edges of the first support rail and the second support rail, and edges of adjacent deformations stages.

6. The device of claim 2, wherein one or both of the first support rail and the second support rail includes one or more anchor cleats on a the bottom side of the base section opposite to the pitched surface, wherein the one or more anchor cleats are configured to dig into the earth and secure the device when a vehicle transits over the device.

7. The device of claim 1, wherein the flexible material comprises a rubber material.

8. The device of claim 1, wherein the plurality of tread deformation stages and the thru slats are distributed in an alternating pattern between the first support rail and the second support rail.

9. The device of claim 1, wherein one or more of the plurality of the tread deformations stages includes one or more anchor cleats on a the bottom side of the base section opposite to the pitched surface, wherein the one or more anchor cleats are configured to dig into the earth and secure the device when a vehicle transits over the device.

10. The device of claim 1, wherein the plurality of tread deformation stages are configured with a spacing such that vehicles transiting over the device with a tire size of 13 inches or greater will not bottom out through the thru slats.

11. The device of claim 1, wherein the plurality of tread deformation stages are each fabricated as a continuous piece of flexible material.

12. The device of claim 11, wherein the flexible material comprises a rubber material.

13. A method for mitigating vehicular tracking of sediment, the method comprising:
   deploying a vehicle tracking control (VTC) device at an access point, wherein the VTC device comprises:
      a plurality of tread deformations stages each including a base and a pitched surface having a peak with a serrated edge, wherein the tire deformations stages are separated with thru slats that expose regions of the ground over which the VTC device is deployed;
      a first support rail; and
      a second support rail, wherein the tread deformation stages run laterally between the first support rail and the second support rail;
      wherein the plurality of tread deformation stages and the first and second support rails are fabricated as a continuous piece of flexible material;
   removing sedimentary particles from vehicle treads while a vehicle is driving over the VTC device, wherein removing sedimentary particles comprises deforming the vehicle treads with the serrated edge; and
   removing the VTC device from the access point.

14. The method of claim 13, wherein removing sedimentary particles from vehicle treads while a vehicle is driving over the VTC device further comprises;
   loosening sediment embedded in the treads using the weight of the vehicle to cause the peak to deform the vehicle treads; and
   scraping a surface of the vehicle tread using the peak.

15. The method of claim 13, the pitched surface comprising:
   a first pitched side rising from a first side of the base section;
   a second pitched side rising from a second side of the base section opposite to the first side of the base section;
   wherein the first pitched side and the second pitched side converge at the peak.

16. The method of claim 13, wherein at least one of the first support rail, the second support rail, or the tread deformation stages include one or more anchor cleats, the method further comprising:
   digging into the Earth with the one or more anchor cleats to secure the VTC device when the vehicle is driving over the VTC device.

17. The method of claim 13 further comprising:
   periodically lifting the VTC device to remove sediment deposited through the thru slats.

18. The method of claim 13, wherein removing the VTC device from the access point further comprises lifting the VTC device up and out from the access point.

\* \* \* \* \*